Sept. 4, 1928.
W. S. SMITH ET AL
1,682,941
TELEGRAPHY
Filed Jan. 21, 1928
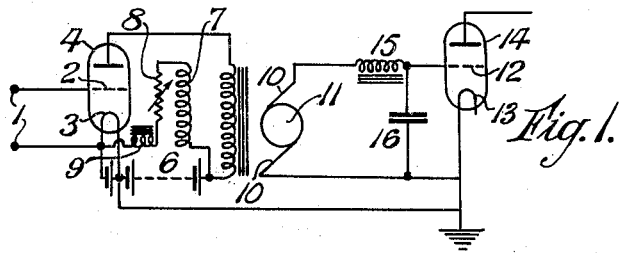
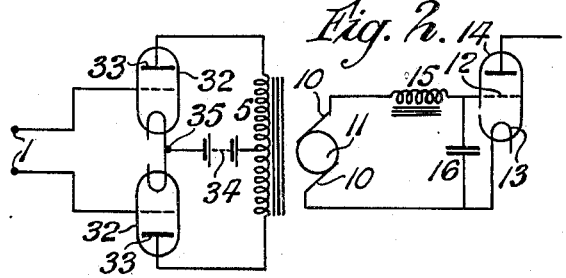
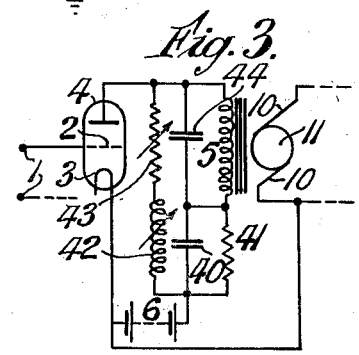
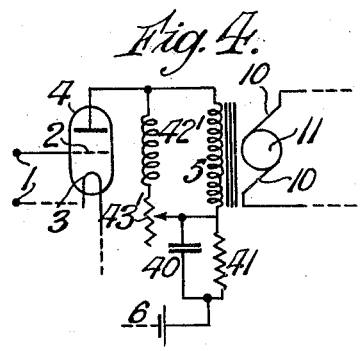
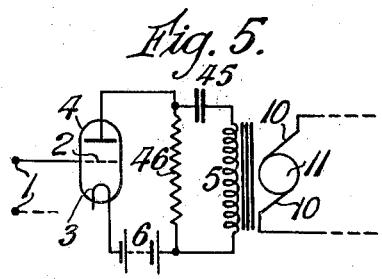
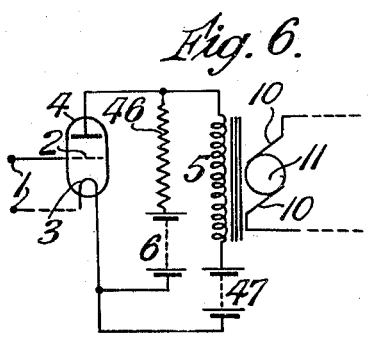
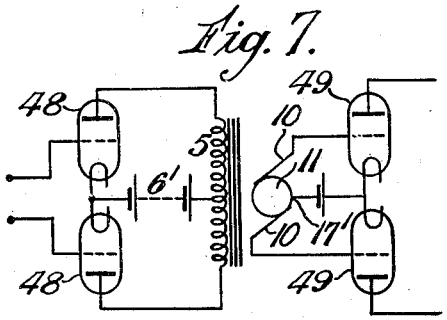
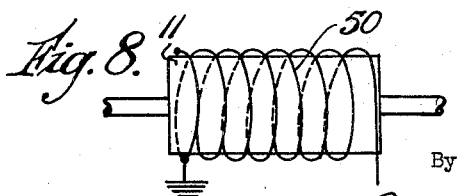
INVENTORS:
W. S. SMITH,
N. W. McLACHLAN,
W. G. R. JACOB.
By their Attorneys, Patented Sept. 4, 1928.

1,682,941

UNITED STATES PATENT OFFICE.

WILLOUGHBY STATHAM SMITH, OF NEWTON POPPLEFORD, AND NORMAN WILLIAM McLACHLAN AND WILLIAM GORDON REED JACOB, OF LONDON, ENGLAND.

TELEGRAPHY.

Application filed January 21, 1928, Serial No. 248,461, and in Great Britain August 23, 1926.

This invention relates to telegraphy, and is particularly applicable to submarine cable and like forms of telegraphy.

This invention envisages the employment in telegraph apparatus of one or more generator machines to whose field windings are applied the signal currents to be amplified, or functions thereof, the output from the armature or armatures of the said machine or machines in which are generated voltages corresponding to the signal currents to be amplified being applied to the input circuit of a thermionic valve or valves.

When two machines are provided the field windings of the second machine are preferably supplied from the anode circuit of the thermionic valve whose grid circuit is energized from the first machine, so that the valve in effect, couples the said machines. More than two generator machines may similarly be coupled in cascade.

It will be seen that with this arrangement all the generator machines in cascade series (except possibly the last machine) operate under conditions approximating to no load, since the armatures have only to supply voltage and little, if any, current. This arrangement clearly makes for faithful and distortionless functioning.

Preferably means are provided for preventing the anode direct current feed from traversing the field windings, or alternatively, means are provided for compensating for the effect of such direct current.

Preferably also means are provided for electrostatically shielding the field windings of each generator machine from the armature thereof and/or vice versa.

The invention is illustrated in the accompanying diagrammatic drawings, in which Figure 1 shows the circuit arrangement of my invention in connection with the field circuit of the generator; Fig. 2 shows a pair of electron tubes connected to control the generator system; Fig. 3 illustrates a shaping circuit applied to the generator control system; Fig. 4 represents a modified form of shaping circuit employed in connection with the generator system; Fig. 5 shows one form of connection for the field winding and the control circuit according to my invention; Fig. 6 shows a form of circuit in which the direct current supplied to the anode is prevented from passing through the field winding; Fig. 7 shows a push pull arrangement for the tube circuits of the control system; and Fig. 8 illustrates one method of shielding the generator armature in the system of my invention.

Referring to Figure 1 the received signals or other impulses to be amplified are applied at 1 between the grid 2 and the cathode 3 of a thermionic valve 4, whose anode circuit is completed through the field windings 5 of a generator machine and an anode battery 6 to the cathode. The machine is provided with a compensating field winding 7 which is supplied with direct current from a local battery (which may conveniently be the anode battery), the arrangement being such that the field, due to the compensating winding, neutralizes that part of the main field, due to the direct current component of the anode feed. 8 is a resistance and 9 an inductance, (either or both of which may be variable), which are included in series with the compensating field winding, the said rheostat and inductance serving to control the balancing current in the compensating winding and to reduce the effect of voltages induced from the main field winding. Brushes 10 bearing upon the armature 11 of the generator machine are connected (via a choke 15 and condenser 16 serving to smooth the output from the machine) between the grid 12 and cathode 13 of a second thermionic valve 14 (whose cathode is connected to the cathode of the first valve, and, if desired, earthed), so that the said generator machine in effect couples the valves together as well as acting as a rotary transformer or "relay". Any desired number of valves may be similarly coupled together and arranged in cascade, the output of the last valve being applied to a recorder or other receiving or re-transmitting device either directly or through one or more generators arranged in cascade.

If desired one or more amplitude limiting devices may be employed in one or more of the stages. Such a device may comprise a thermionic valve whose filament current and grid bias are adjusted so that the said valve either works up to saturation or has grid current due to the voltage peak.

In the modification, illustrated in Figure 2, the signals are applied between the grids of a pair of thermionic valves 32 arranged back to back, the anodes 33 of the said valves being connected together through the field winding 5 of the machine 5—11. The approximate mid point of this field winding is connected through an anode battery 34 to the common cathode lead 35.

It will be understood that various modifications may be made without departing from the scope of the invention as above set forth. For example, any thermionic valve may be replaced by valves in parallel.

If desired a shaping circuit or circuits may be included in the anode circuit or circuits of one or more of the valves 4 (Figure 1) or 32 (Figure 2). Such an arrangement is illustrated in Figure 3 in which the shaping circuit comprises a resistance shunted condenser 40, 41 in series with the main field winding 5 in the anode circuit of the valve 4, the said condenser 40 and field winding being together shunted by an inductance 42 and a resistance 43 (either or both of which may be variable) in series, while an additional condenser 44 is connected in shunt with the said field winding. In an alternative arrangement of shaping circuit illustrated in Figure 4, an inductance 42' and resistance 43' in series (either or both of which may be variable) are connected in shunt with the main field winding 5, a resistance shunted condenser 40, 41 being connected in series with the said field winding.

In a further modification illustrated in Figure 5 the compensating field winding 7 of Figure 1 is replaced by means which prevent the anode direct current feed from passing through the main field winding 5. In this modification a blocking condenser 45 is connected in series with the main field winding 5 between the anode and cathode of the thermionic valve 4, the anode direct current feed circuit therefor being completed from the anode through an anode resistance 46 and anode battery 6 to the cathode 3. In this arrangement the blocking condenser assists in shaping the signals. In a modification (illustrated in Figure 6) of this arrangement for preventing direct current anode feed from passing through the field winding, the blocking condenser is dispensed with, and a balancing battery 47 connected in series with the said field winding.

In yet another modification illustrated in Figure 7, a receiver is arranged in push-pull fashion, the field winding 5 being connected between the anodes of two valves 48 arranged back to back, the anode circuits of the said valves being completed from an approximate mid-point tapping upon the said field winding, through a common anode battery 6' to the common cathode. The brushes 10 of the generator machine are connected to the grids of two further valves 49 arranged in push-pull fashion back to back, the common cathode lead being connected to a third brush 17' upon the machine and arranged substantially at the electrical midpoint between the other brushes.

The generator machines may be either direct current or alternating current. When alternating current machines are used, the output from the last stage of the amplifier may be rectified and smoothed in known manner.

Again, if desired, the armature 11 of one or more of the generator machines 5—11 may be electrostatically shielded from its associated field winding 5 and/or vice versa. A convenient shielding arrangement is illustrated in Fig. 8 and comprises an insulated wire 50 wound round the armature 11 and earthed either by connection to the core or to a separate slip ring (not shown). In addition to or in place of the wire 50 insulated and earthed metal foil may be wrapped round the field windings, care being taken to ensure that the said foil does not act as a short-circuited secondary winding.

In the arrangements hereinbefore described any valve may be replaced by a plurality of valves in parallel. Again any main field winding may be composed of a number of sections, each section being associated with a thermionic valve or valves.

Telegraph receivers made in accordance with this invention have important advantages over those hitherto known. For example, an advantage to be obtained in the last stage of a cascade series is due to the fact that the armature of a generator machine is of very low impedance and is therefore very suitable for supplying power to an instrument such as a recorder. Again, the generator machines 5—11 may be employed either as amplifiers or coupling devices or both, while as hereinbefore stated the machines 5—11 operate under very low load conditions except possibly in the case of the last machine of a series.

What we claim is:—

1. Telegraph apparatus comprising in combination generating means, field windings in said means, thermionic means for applying signals to be amplified to said windings, output means in said generating means, output thermionic means, means for applying to the input side of said output thermionic means signal proportional output from said generating means, and means for compensating for direct current for said first mentioned thermionic means passing through said field windings.

2. Telegraph apparatus comprising in combination generating means, shielded field windings in said means, thermionic means for applying signals to be amplified to said windings, output means in said generating means, output thermionic means, means for applying to the input side of said output thermionic means signal proportional output from said generating means, and means for compensating for direct current for said first mentioned thermionic means passing through said field windings.

3. Telegraph apparatus comprising in combination generating means, main field windings in said means, auxiliary field windings, a source of direct current for energizing said auxiliary windings, thermionic means for applying signals to be amplified to said main windings, output means in said generating means, output thermionic means, means for applying to the input side of said output thermionic means signal proportional output from said generating means, and means for blocking direct current supplied to said first mentioned thermionic means from passing through said field windings.

4. In combination, generating means, field windings in said means, thermionic means for applying signals to be amplified to said windings, a direct current supply for said means and means for blocking the direct current supply for said thermionic means from said field windings.

5. In combination, generating means, shielded field windings in said means, thermionic means for applying signals to be amplified to said windings, and means for compensating for direct current for said thermionic means passing through said field windings.

6. In combination, generating means, main field windings and auxiliary field windings in said means, a source of direct current for energizing said auxiliary windings, thermionic means for applying signals to be amplified to said main windings, and means for compensating for direct current for said thermionic means passing through said field windings.

In testimony that we claim the foregoing as our invention, we have signed our names this ninth day of December, 1927.

WILLOUGHBY STATHAM SMITH.
NORMAN WILLIAM McLACHLAN.
WILLIAM GORDON REED JACOB.